US011303841B2

(12) United States Patent
Tada (10) Patent No.: US 11,303,841 B2
(45) Date of Patent: Apr. 12, 2022

(54) SENSOR, APPARATUS AND METHOD OF CONTROLLING READOUT OF SIGNALS (71) Applicant: CANON KABUSHIKI KAISHA, Tokyo (JP)

(72) Inventor: Yui Tada, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/222,517

(22) Filed: Apr. 5, 2021

(65) Prior Publication Data
US 2021/0314514 A1 Oct. 7, 2021

(30) Foreign Application Priority Data

Apr. 7, 2020 (JP) .............................. JP2020-069278

(51) Int. Cl.
| H04N 5/378 | (2011.01) |
| H04N 5/345 | (2011.01) |
| H04N 5/374 | (2011.01) |
| H04N 5/369 | (2011.01) |
| H04N 5/363 | (2011.01) |
| H04N 5/232 | (2006.01) |
| H04N 5/3745 | (2011.01) |

(52) U.S. Cl.
CPC ............. *H04N 5/378* (2013.01); *H04N 5/345* (2013.01); *H04N 5/363* (2013.01); *H04N 5/36961* (2018.08); *H04N 5/37452* (2013.01)

(58) Field of Classification Search
CPC ...... H04N 5/378; H04N 5/345; H04N 5/3696; H04N 5/363; H04N 5/37452; H04N 5/23212; H04N 5/232122

USPC ....... 348/241, 243, 301, 302, 308, 294, 297, 348/326, 345, 248, 470, 533; 257/291, 257/292, 293, 443; 250/208.1
See application file for complete search history.

(56) References Cited

U.S. PATENT DOCUMENTS

| 9,554,068 | B2 * | 1/2017 | Ohshitanai | ........... H04N 5/3696 |
| 9,948,850 | B2 * | 4/2018 | Suzuki | ............... H04N 5/23212 |
| 10,523,860 | B2 * | 12/2019 | Hamano | ............ H04N 5/23212 |
| 2013/0229557 | A1 * | 9/2013 | Hashimoto | .......... H04N 5/3745 |
| | | | | 348/241 |
| 2014/0036121 | A1 * | 2/2014 | Minowa | ............... H04N 5/3745 |
| | | | | 348/301 |
| 2014/0320720 | A1 * | 10/2014 | Ohshitanai | ......... H04N 5/37213 |
| | | | | 348/311 |

(Continued)

FOREIGN PATENT DOCUMENTS

JP 2016-219993 A 12/2016

*Primary Examiner* — Marly S Camargo
(74) *Attorney, Agent, or Firm* — Canon U.S.A., Inc. IP Division (57) ABSTRACT

A sensor includes a pixel portion having first and second areas; and a controller that controls readout of signals from the pixel portion in units of rows. The controller controls to read out a noise signal and an image signal, from each pixel in the first area, controls to read out a noise signal, a focus detection signal, and an image signal, from each pixel in the second area. Further, a time from when the noise signal is read out to when the image signal is read out from each pixel is controlled to be equal between the first area and the second area, and during that time, at least one of the noise signal and the image signal is read out from another row in the first area.

20 Claims, 9 Drawing Sheets

(56) References Cited

U.S. PATENT DOCUMENTS

| | | | |
|---|---|---|---|
| 2016/0127669 A1* | 5/2016 | Yamazaki | H04N 5/378 348/300 |
| 2017/0041563 A1* | 2/2017 | Suzuki | H04N 5/23212 |
| 2019/0098231 A1* | 3/2019 | Iwata | H04N 5/341 |
| 2020/0021744 A1* | 1/2020 | Kikuchi | H04N 5/23245 |
| 2021/0352225 A1* | 11/2021 | Nishihara | H04N 5/32 |

* cited by examiner

SENSOR, APPARATUS AND METHOD OF CONTROLLING READOUT OF SIGNALS

BACKGROUND OF THE DISCLOSURE

Field of the Disclosure

The aspect of the embodiments relates to a sensor, an apparatus and method of controlling readout of signals, and more specifically to a technique of reading out an image signal from an image sensor.

Description of the Related Art

In recent years, the number of functions of image sensors has increased, and for example, there are image capturing apparatuses capable of performing so-called pupil division focus detection. In order to perform the pupil division focus detection, Japanese Patent Laid-Open No. 2016-219993 proposes a structure in which each of some pixels of a pixel array is provided with one microlens and two photoelectric converters. The photoelectric converters of each pixel receive light that has passed through different pupil regions, and perform focus detection and image shooting. Further, Japanese Patent Laid-Open No. 2016-219993 discloses a configuration in which different pixel rows are used for pixel rows that are used for both focus detection processing and image forming processing and pixel rows that are used only for the image forming processing.

However, in a signal readout method as disclosed in Japanese Patent Laid-Open No. 2016-219993, a period from when a noise signal is read out until an image signal is read out is different between the pixel rows assigned to both the focus detection processing and the image forming processing and the pixel rows assigned only to the image forming processing. Therefore, there is an issue that the amount of noise on the image signal is different between the rows, which causes a gap, and, as a result, the image quality is deteriorated.

SUMMARY OF THE DISCLOSURE

A sensor comprising: a pixel portion, where a plurality of pixels are arranged in a matrix, having a first area from which image signals are output and a second area from which image signals and focus detection signals are output; and a controller that controls readout of signals from the pixel portion in units of rows, wherein the controller controls to read out a noise signal that is a signal corresponding to a reset level for resetting each pixel and an image signal, from each pixel in the first area, controls to read out a noise signal that is a signal corresponding to a reset level for resetting each pixel, a focus detection signal, and an image signal, from each pixel in the second area, and controls so that a time from when the noise signal is read out to when the image signal is read out from each pixel becomes equal between the first area and the second area, and in the first area, during a period after the noise signal is read out before the image signal is read out from each pixel, at least one of the noise signal and the image signal from another row in the first area is read out.

Further, an apparatus comprising: a sensor having: a pixel portion, where a plurality of pixels are arranged in a matrix, having a first area from which image signals are output and a second area from which image signals and focus detection signals are output; and a controller that controls readout of signals from the pixel portion in units of rows, wherein the controller controls to read out a noise signal that is a signal corresponding to a reset level for resetting each pixel and an image signal, from each pixel in the first area, controls to read out a noise signal that is a signal corresponding to a reset level for resetting each pixel, a focus detection signal, and an image signal, from each pixel in the second area, and controls so that a time from when the noise signal is read out to when the image signal is read out from each pixel becomes equal between the first area and the second area, and in the first area, during a period after the noise signal is read out before the image signal is read out from each pixel, at least one of the noise signal and the image signal from another row in the first area is read out; a generation unit that generates a second focus detection signal for each pixel in the second area by taking a difference between the image signal and the focus detection signal; and a focus detection unit that performs focus detection based on a phase difference between the focus detection signals and the second focus detection signals.

Furthermore, a method of controlling readout of signals in units of rows from an image sensor having a pixel portion, where a plurality of pixels are arranged in a matrix, having a first area from which image signals are output and a second area from which image signals and focus detection signals are output, the method comprising: reading out a noise signal that is a signal corresponding to a reset level for resetting each pixel and an image signal, from each pixel in the first area, reading out a noise signal that is a signal corresponding to a reset level for resetting each pixel, a focus detection signal, and an image signal, from each pixel in the second area, and controlling so that a time from when the noise signal is read out to when the image signal is read out from each pixel becomes equal between the first area and the second area, and in the first area, during a period after the noise signal is read out before the image signal is read out from each pixel, reading out at least one of the noise signal and the image signal from another row in the first area.

Further, a non-transitory computer-readable storage medium, the storage medium storing a program that is executable by a computer, wherein the program includes program codes for causing the computer to execute a method of controlling readout of signals in units of rows from an image sensor having a pixel portion, where a plurality of pixels are arranged in a matrix, having a first area from which image signals are output and a second area from which image signals and focus detection signals are output, the method comprising: reading out a noise signal that is a signal corresponding to a reset level for resetting each pixel and an image signal, from each pixel in the first area, reading out a noise signal that is a signal corresponding to a reset level for resetting each pixel, a focus detection signal, and an image signal, from each pixel in the second area, and controlling so that a time from when the noise signal is read out to the when image signal is read out from each pixel becomes equal between the first area and the second area, and in the first area, during a period after the noise signal is read out before the image signal is read out from each pixel, reading out at least one of the noise signal and the image signal from another row in the first area.

Further features of the disclosure will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the disclosure, and together with the description, serve to explain the principles of the disclosure.

DESCRIPTION OF THE EMBODIMENTS

Hereinafter, embodiments will be described in detail with reference to the attached drawings. Note, the following embodiments are not intended to limit the scope of the disclosure, and limitation is not made the disclosure that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

Figure 1:
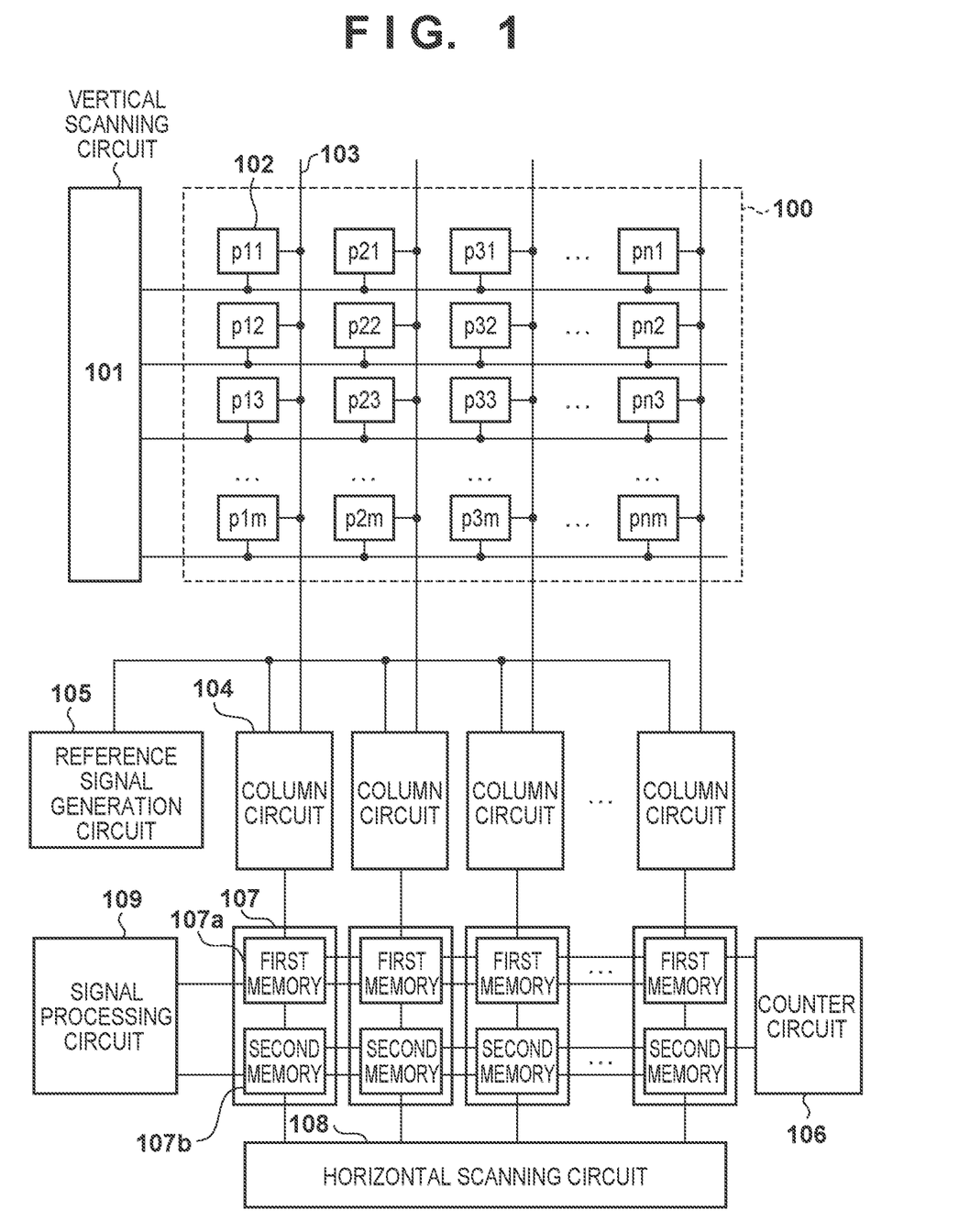
FIG. 1 is a block diagram showing an overall schematic configuration of an image sensor according to first and second embodiments of the disclosure.

FIG. 1 is a block diagram showing an overall schematic configuration of an image sensor according to a first embodiment of the disclosure.

In a pixel unit 100, a plurality of pixels 102 are arranged in a matrix (n rows×m columns) A configuration example of the pixel 102 will be described later with reference to FIG. 2. A vertical scanning circuit 101 supplies a drive signal for driving the pixels 102 to the pixel unit 100 in units of rows.

At least one signal line 103 is connected to each pixel column, and a pixel signal of each pixel column is transferred to a column circuit 104 provided in each column via the signal line 103. The column circuit 104 includes an A/D converter that performs analog-to-digital (A/D) conversion on a pixel signal transferred via the signal line 103. A reference signal generation circuit 105 supplies a reference voltage that increases or decreases in proportion to time to the A/D converter included in each column circuit 104. The A/D converter compares the pixel signal with the reference voltage, and when the magnitude relationship is inverted, inverts its output.

A memory 107 is provided for each pixel column, and in this embodiment, the memory 107 is composed of a plurality of memories including a first memory 107a and a second memory 107b. A counter circuit 106 supplies each memory 107 with a counter value that counts up with the start of comparison between the pixel signal and the reference voltage by the A/D converter being 0. The memory 107 holds the counter value when the output of the A/D converter is inverted as a digital signal of the pixel signal.

A horizontal scanning circuit 108 transfers the digital signal held in each memory 107 to a signal processing circuit 109. The signal processing circuit 109 processes the transferred digital signal of each pixel 102 to generate image data.

Next, an example of the configuration of the pixel 102 will be described with reference to FIG. 2.

Each pixel 102 in the present embodiment has one microlens (not shown), a photoelectric converter 201a and a photoelectric converter 201b (a plurality of photoelectric converters) that receive and perform photoelectric conversion of light passing through different pupil regions of the microlens. Each of the photoelectric converters 201a and 201b accumulates the electric charge generated by the photoelectric conversion.

A transfer transistor 202a and a transfer transistor 202b are connected to the photoelectric converters 201a and 201b, respectively, and drive signals pTXa and pTXb are supplied to the gates thereof. Then, by setting the drive signals pTXa and pTXb to the High level, the transfer transistors 202a and 202b are turned on, and the electric charge accumulated in the photoelectric converters 201a and 201b is transferred to a floating diffusion portion (FD) 203.

The FD 203 is connected to the gate of an amplification transistor 204, and a voltage signal based on the electric charge stored in the FD 203 is amplified and output by the amplification transistor 204.

The source of a reset transistor 205 is connected to the FD 203, and when a drive signal pRES supplied to the gate is changed to the High level, the reset transistor 205 is turned on and the FD 203 is reset to a power supply voltage Vdd. Further, the photoelectric converters 201a and 201b can be reset by simultaneously setting the drive signals pTXa and pTXb and the drive signal pRES to the High level. When the electronic shutter is used, the charge accumulation period of the photoelectric converters 201a and 201b is started by this reset operation.

A drive signal pSEL is supplied to the gate of a selection transistor 206, and the voltage signal amplified by the amplification transistor 204 is output to the signal line 103 as a pixel signal while the drive signal pSEL is at the High level.

In the above configuration, when only the transfer transistor 202a (or 202b) is turned on, the signal of only the photoelectric converter 201a (or 201b) (a part of a plurality of photoelectric converters) can be read out. When both the transfer transistors 202a and 202b are turned on at the same time, the charges accumulated in the photoelectric converters 201a and 201b are added in the FD 203, and the signal obtained by adding the signals of the photoelectric converter 201a and the photoelectric converter 201b is read out. Hereinafter, the signal obtained from the photoelectric converter 201a is referred to as an A signal, the signal obtained from the photoelectric converter 201b is referred to as a B signal, and the signal obtained by adding the signals of the photoelectric converter 201a and the photoelectric converter 201b is referred to as an A+B signal.

Next, with reference to FIG. 3, an example of the configuration of the column circuit 104 and its peripheral circuits in the first embodiment will be described. In the example shown in FIG. 3, a configuration in which the column circuit 104 has only an A/D converter will be described.

A current source 301 is connected to the signal line 103 via a switch 302 to supply a bias current to the amplification transistor 204 of the pixel 102. The switch 302 is arranged between the signal line 103 and the current source 301, and switches between a supply state and a non-supply state of the bias current from the current source 301. The bias current can be supplied by setting a drive signal pVLB supplied to the gate of the switch 302 to the High level.

In the column circuit 104, a sample and hold (S/H) capacitor 305 captures and holds a pixel signal from the signal line 103 via a switch 306. The switch 306 is arranged between the signal line 103 and the S/H capacitor 305, and switches between the connected state and the disconnected state between the signal line 103 and the S/H capacitor 305. By setting a drive signal pSH supplied to the gate of the switch 306 to the High level, the signal line 103 and the S/H capacitor 305 can be connected.

One input terminal of a comparator 303 is connected to the S/H capacitor 305, and the other input terminal is connected to the reference signal generation circuit 105. Then, the comparator 303 compares the pixel signal with the reference voltage supplied from the reference signal generation circuit 105, and outputs the comparison result.

A switch 304 switches between an operating state and a non-operating state of the comparator 303. By setting a drive signal pCOM supplied to the gate of the switch 304 to the High level, the comparator 303 can be put into the operating state.

Next, an example of the output operation of the pixel unit 100 in the present embodiment will be described with reference to FIGS. 4, 5 and 6.

Figure 4:
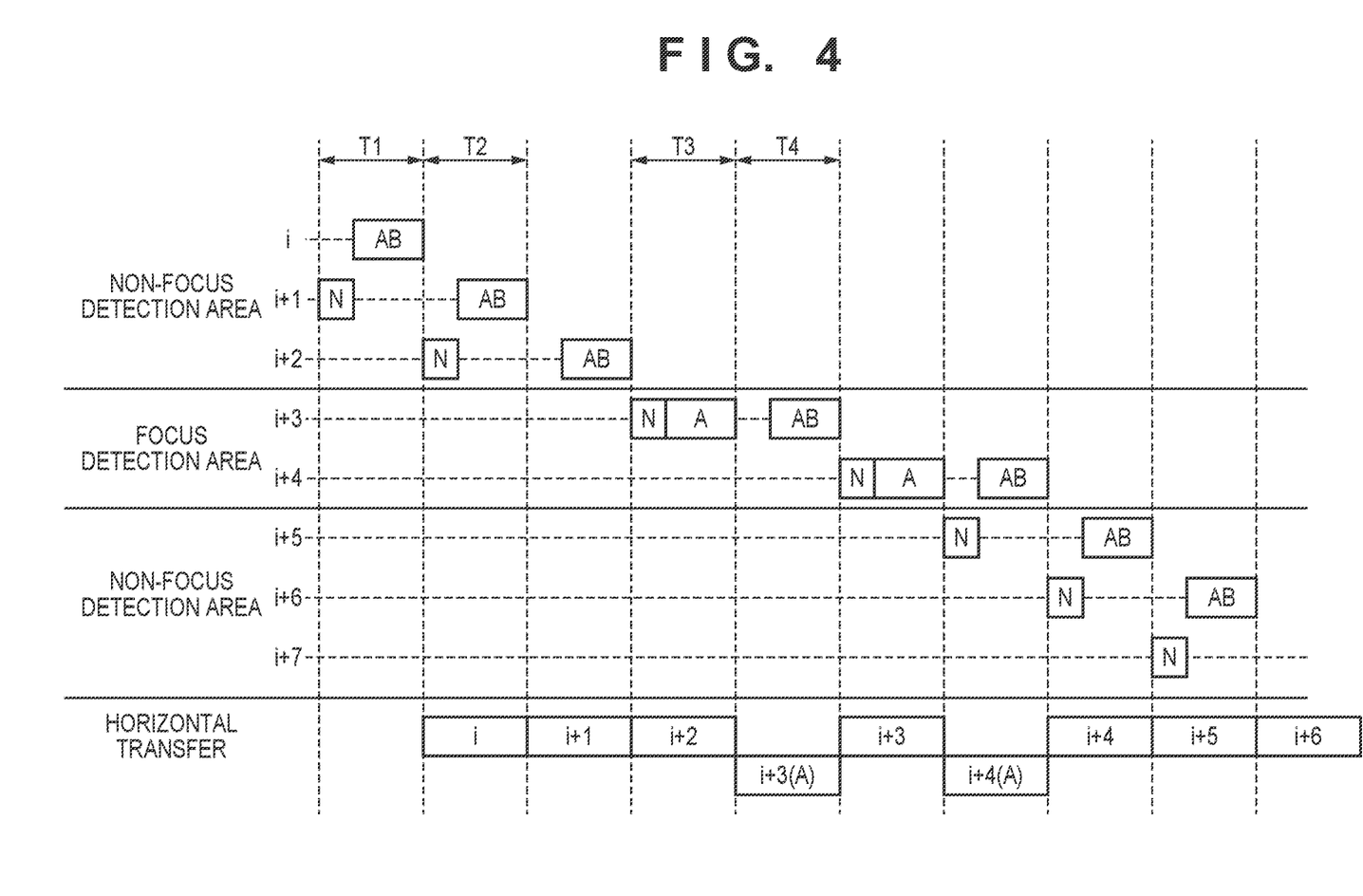
FIG. 4 is a timing chart showing an outline of a signal readout operation from the image sensor according to the first and second embodiments.

FIG. 4 is a timing diagram showing a signal output sequence of each pixel 102. Here, the case where the $i^{th}$ to $i+2^{th}$ rows and the $i+5^{th}$ to $i+7^{th}$ rows of the pixel unit 100 are in non-focus detection areas and the $i+3^{th}$ and $i+4^{th}$ rows are in focus detection areas will be described (note that i is a natural number). The number of rows and positions of the pixels for focus detection are arbitrary, and for example, the focus detection areas and the non-focus detection areas may be set alternately. Signals are read out from the pixels in the non-focus detection areas and the focus detection areas at the timings according to drive signals, described later, shown in FIGS. 5 and 6, respectively.

Figure 2:
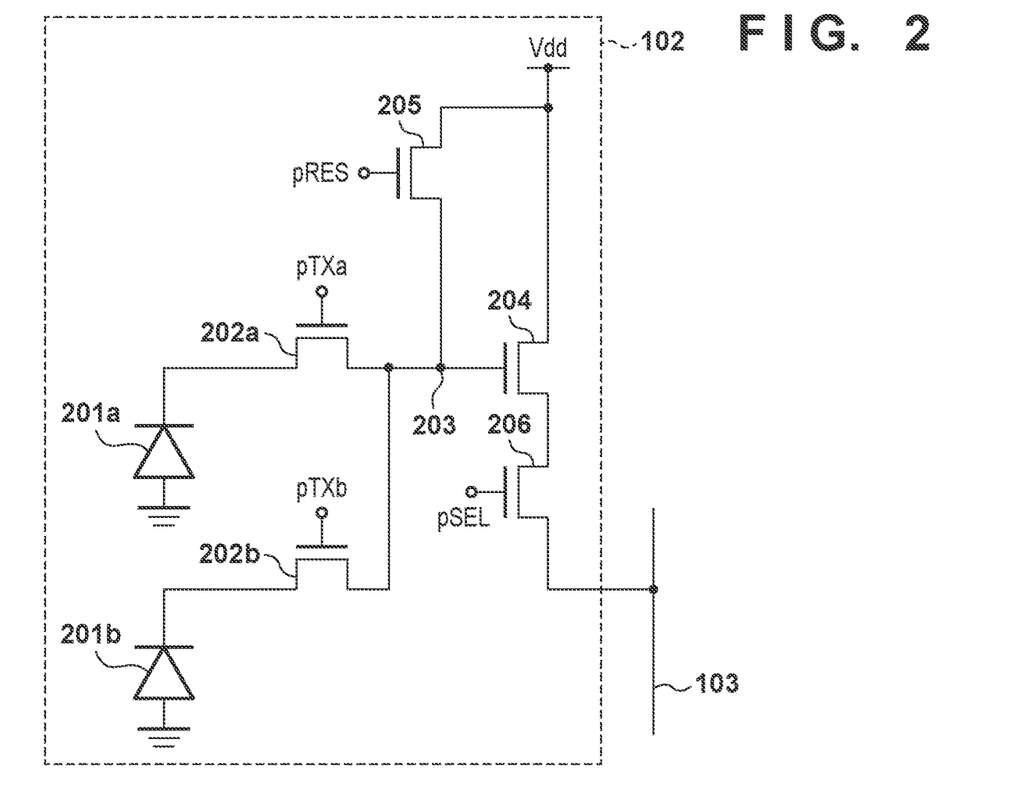
FIG. 2 is a circuit diagram showing a schematic configuration of a pixel according to the first and second embodiments.

In the non-focus detection areas, a noise signal N, which represents the reset level of the FD 203, and an A+B signal (image signal), which is an addition signal of the photoelectric converter 201a and the photoelectric converter 201b, are output from each pixel 102 having the configuration shown in FIG. 2.

On the other hand, in the focus detection areas, a noise signal N, an A signal obtained by transferring the charge of the photoelectric converter 201a, and an A+B signal (image signal) obtained by adding the charges of the photoelectric converter 201a and the photoelectric converter 201b are output from each pixel 102. By subtracting the A signal from the A+B signal, a B signal can be generated, thereby a pair of focus detection signals (A signal, B signal) having parallax are obtained.

Figure 5:
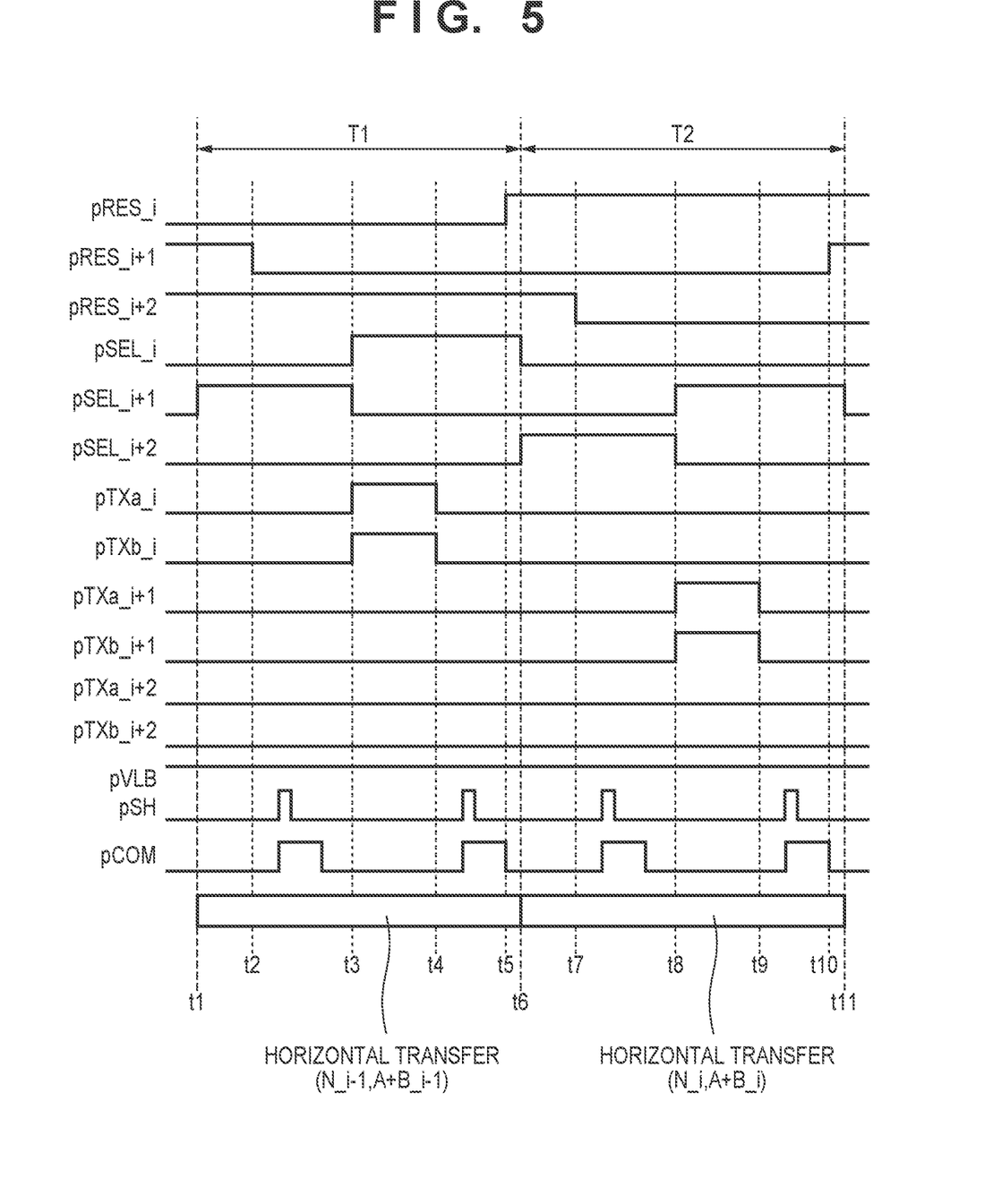
FIG. 5 is a timing chart showing a readout operation of a non-focus detection pixel according to the first embodiment.
Figure 6:
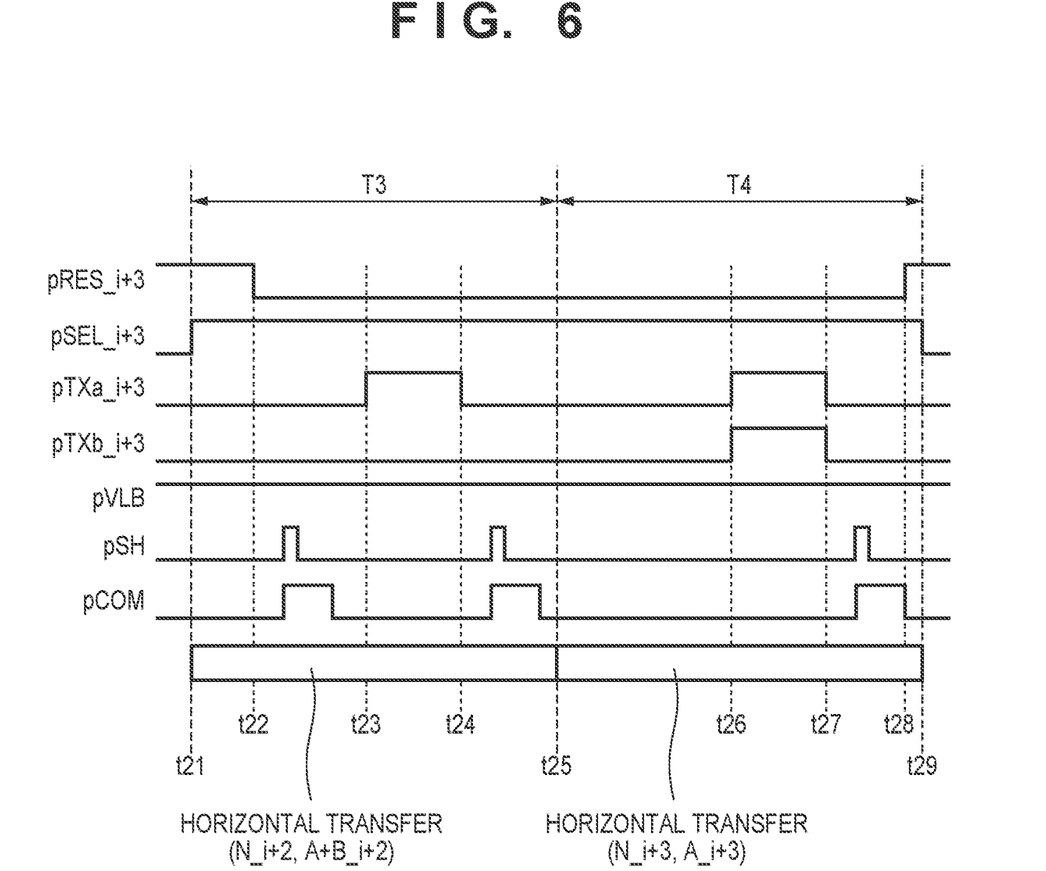
FIG. 6 is a timing chart showing a readout operation of a focus detection pixel according to the first embodiment.

FIG. 5 is a timing chart showing the timing of drive signals during readout periods T1 and T2 of the pixels in the non-focus detection areas shown in FIG. 4. In the following description, the drive signals of each row are shown by appending the row number to each of the drive signals shown in FIGS. 2 and 3. For example, the drive signal pRES of the reset transistor 205 of the pixel 102 on the $i+1^{th}$ row is described as the drive signal pRES_i+1. Further, in the following description, a pixel signal appended with the row number is referred to as the pixel signal of that row. For example, the noise signal on the $i+1^{th}$ row is described as the noise signal N_i+1.

At time t1, by setting the drive signal pSEL_j+1 to the High level, the selection transistors 206 of the pixels 102 on the $i+1^{th}$ row are turned ON. As a result, the pixels 102 on the $i+1^{th}$ row are connected to the signal lines 103. After that, by setting the drive signal pRES_i+1 to the Low level at time t2, the reset transistors 205 of the pixels 102 on the $i+1^{th}$ row are turned off, and the resetting of the FDs 203 is completed. After that, the noise signals N_i+1 are output to the signal lines 103 from the FDs 203 via the amplification transistors 204. Then, the analog noise signals N_i+1 are held in the S/H capacitors 305 by setting the drive signal pSH to the High level between the time t2 and the time t3. Further, by setting the drive signal pCOM to the High level, the comparators 303 are put into the operating state and comparison with the reference voltage is started. The counter circuit 106 starts counting up the counter value in response to the start of this comparison, and the counter value when the output of the comparator 303 is inverted according to the comparison result is held in the first memory 107a. As a result, the analog noise signals N_i+1 can be A/D converted (corresponding to N on the $i+1^{th}$ row in FIG. 4).

Subsequently, by setting the drive signal pSEL_i+1 to the Low level and the drive signal pSEL_i to the High level at time t3, the pixels 102 on the $i+1^{th}$ row are disconnected from the signal lines 103, and the pixels 102 on the $i^{th}$ row are connected to the signal lines 103. Then, by setting the drive signal pTXa_i and the drive signal pTXb_i to the High level between time t3 and time t4, the transfer transistors 202a and 202b of the pixels 102 on the $i^{th}$ row are turned on. As a result, the charges accumulated in the photoelectric converters 201a and 201b of each pixel 102 on the $i^{th}$ row are added in the FD 203.

After that, at time t4, the transfer transistors 202a and 202b of the pixels 102 on the $i^{th}$ row are turned off. Then, the charges added in the 1-Ds 203 are output to the signal lines 103 as the image signals A+B_i via the amplification transistors 204. Then, the analog image signals A+B_i are held in the S/H capacitors 305 by setting the drive signal pSH to the High level between time t4 and time t5. Then, by setting the drive signal pCOM to the High level, the comparators 303 are put into the operating state and comparison with the reference voltage is started. Then, the counter values when the outputs of the comparators 303 are inverted according to the comparison results are held in the second memories 107b. As a result, the analog image signals A+B_i are A/D converted (corresponding to AB on the i-th row in FIG. 4).

Next, at time t5, by setting the drive signal pRES_i to the High level, the reset transistors 205 on the $i^{th}$ row are turned on to reset the FDs 203 on the $i^{th}$ row.

Subsequently, by setting the drive signal pSEL_i to the Low level at time t6, the pixels 102 on the $i^{th}$ row are disconnected from the signal lines 103, and the pixel selection is completed. Then, at this timing, the horizontal scanning circuit 108 transfers the noise signals N_i and the image signals A+B_i of the $i^{th}$ row, stored in the second memories 107b before the start of the timing chart in FIG. 5, to the signal processing circuit 109. In the signal processing circuit 109, an image signal with reduced noise is obtained by taking the differences between the digital image signals A+B_i and the noise signals N_i.

Then, by also setting the drive signal pSEL_i+2 to the High level at time t6, the pixels 102 on the i+2$^{th}$ row are connected to the signal lines. After that, by setting the drive signal pRES_i+2 to the Low level at time t7, the reset transistors 205 of the pixels 102 on the i+2$^{th}$ row are turned off, and the resetting of the FDs 203 is completed. After that, the noise signals N_i+2 are output to the signal lines 103 from the FDs 203 via the amplification transistors 204. Then, by setting the drive signal pSH to the High level between time t7 and time t8, the analog noise signals N_i+2 are held in the S/H capacitors 305. Then, by setting the drive signal pCOM to the High level, the comparators 303 are put into the operating state and comparison with the reference voltage is started. The counter values when the outputs of the comparators 303 are inverted according to the comparison results are stored in the second memories 107b. As a result, the analog noise signals N_i+2 can be A/D converted (corresponding to N on the i+2$^{th}$ row in FIG. 4).

Subsequently, by setting the drive signal pSEL_i+2 to the Low level and the drive signal pSEL_i+1 to the High level at time t8, the pixels 102 on the i+2$^{th}$ row are disconnected from the signal lines 103, and the pixels 102 on the i+1$^{th}$ row are connected to the signal lines 103. Then, by setting the drive signal pTXa_i+1 and the drive signal pTXb_i+1 to the High level, the transfer transistors 202a and 202b of the pixels 102 on the i+1$^{th}$ row are turned on. As a result, the charges accumulated in the photoelectric converters 201a and 201b of the pixels 102 on the i+1$^{th}$ row are added in the FDs 203.

After that, at time t9, the transfer transistors 202a and 202b of the pixel 102 on the i+1$^{th}$ row are turned off. Then, the electric charges added in the FDs 203 are output to the signal lines 103 as image signals A+B_i+1 via the amplification transistor 204. Then, the analog image signals A+B_i+1 are held in the S/H capacitors 305 by setting the drive signal pSH to the High level between time t9 and time t10. Then, by setting the drive signal pCOM to the High level, the comparators 303 are put into the operating state and comparison with the reference voltage is started. Then, the counter values when the outputs of the comparators 303 are inverted according to the comparison result are held in the first memories 107a. As a result, the analog image signals A+B_i+1 are A/D converted (corresponding to AB on the i+1$^{th}$ row in FIG. 4).

Next, at time t10, by setting the drive signal pRES_i+1 to the High level, the reset transistors 205 on the i+1$^{th}$ row are turned ON, and the FDs 203 on the i+1$^{th}$ row are reset.

Subsequently, by setting the drive signal pSEL_i+1 to the Low level at time t11, the pixels 102 on the i+1$^{th}$ row are disconnected from the signal lines 103, and the pixel selection is completed. Then, at this timing, the noise signals N_i+1 and the image signals A+B_i+1 of the i+1$^{th}$ row are transferred from the first memories 107a to the signal processing circuit 109 by the horizontal scanning circuit 108. In the signal processing circuit 109, an image signal with reduced noise is obtained by taking the differences between the digital image signals A+B_i+1 and the noise signals N_i+1.

After time t11, the noise signals of the i+3th row are not read out, and the image signals A+B_i+2 are read out and A/D converted by performing the same operation as that performed after time t3 in the readout period T1 or after time t8 in the readout period T2 (corresponds to AB on the i+2th row in FIG. 4). Then, the noise signals N_i+2 and the image signals A+B_i+2 of the i+2$^{th}$ row are transferred from the second memories 107b to the signal processing circuit 109 by the horizontal scanning circuit 108. In the signal processing circuit 109, an image signal with reduced noise is obtained by taking the differences between the digital image signals A+B_i+2 and the noise signals N_i+2.

Next, with reference to FIG. 6, the pixel readout operation of pixels on the i+3$^{th}$ row in the focus detection areas during the pixel readout periods T3 and T4 of the focus detection areas in FIG. 4 will be described.

At time t21, by setting the drive signal pSEL_i+3 to the High level, the selection transistors 206 of the pixels 102 on the i+3$^{th}$ row are turned ON. As a result, the pixels 102 on the i+3$^{th}$ row are connected to signal lines 103. After that, by setting the drive signal pRES_i+3 to the Low level at time t22, the reset transistors 205 of the pixels 102 on the i+3$^{th}$ row are turned off, and the resetting of the FDs 203 are completed. After that, the noise signals N_i+3 are output to the signal lines 103 from the FDs 203 via the amplification transistors 204. Then, by setting the drive signal pSH to the High level between time t22 and time t23, the analog noise signals N_i+3 are held in the S/H capacitors 305. Further, by setting the drive signal pCOM to the High level, the comparators 303 are put into the operating state and comparison with the reference voltage is started. The counter values when the outputs of the comparators 303 are inverted according to the comparison results are held in the first memories 107a. As a result, the analog noise signals N_i+3 are A/D converted (corresponding to N in the i+3$^{th}$ row in FIG. 4).

Next, by setting the drive signal pTXa_i+3 to the High level between time t23 and time t24, the transfer transistors 202a of the pixels 102 on the i+3$^{th}$ row are turned on. As a result, the charges stored in the photoelectric converters 201a of the pixels 102 on the i+3$^{th}$ row are transferred to the FDs 203.

After that, at time t24, the transfer transistors 202a of the pixels 102 on the i+3$^{th}$ row are turned off. Then, the charges transferred to the FDs 203 are output to the signal lines 103 as focus detection signals A_i+3 via the amplification transistors 204. Then, by setting the drive signal pSH to the High level between time t24 and time t25, the analog focus detection signals A_i+3 are held in the S/H capacitors 305. Then, by setting the drive signal pCOM to the High level, the comparators 303 are put into the operating state and comparison with the reference voltage is started. Then, the counter values when the outputs of the comparators 303 are inverted according to the comparison results are held in the first memories 107a. As a result, the analog focus detection signals A_i+3 are A/D converted (corresponding to A in the i+3$^{th}$ row in FIG. 4).

Then, at time t25, the noise signals N_i+3 and the focus detection signals A_i+3 of the i+3$^{th}$ row are transferred from the memories 107 to the signal processing circuit 109 by the horizontal scanning circuit 108. The signal processing circuit 109 obtains a first focus detection signal with reduced noise by taking the differences between the digital focus detection signals A_i+3 and the noise signals N_i+3.

Next, by setting the drive signal pTXa_i+3 and the drive signal pTXb_i+3 to the High level between time t26 and time t27, the transfer transistors 202a and 202b of the pixels 102 on the i+3$^{th}$ row are turned on. As a result, the charges accumulated in the photoelectric converters 201a and 201b of the pixels 102 on the i+3$^{th}$ row are added in the FDs 203.

After that, at time t27, the transfer transistors 202a and 202b of the pixels 102 on the i+3$^{th}$ row are turned off. Then, the charges added in the FDs 203 are output to the signal lines 103 as image signals A+B_i+3 via the amplification transistors 204. Then, the analog image signals A+B_i+3 are held in the S/H capacitors 305 by setting the drive signal pSH to the High level between time t27 and time t28. Then, by setting the drive signal pCOM to the High level, the comparators 303 are put into the operating state and comparison with the reference voltage is started. Then, the counter values when the outputs of the comparators 303 are inverted according to the comparison results are held in the first memories 107a. As a result, the analog image signals A+B_i+3 are A/D-converted (corresponding to AB on the i+3$^{th}$ row in FIG. 4).

Next, by setting the drive signal pRES_i+3 to the High level at time t28, the reset transistors 205 on the i+3$^{th}$ row are turned ON, and the FDs 203 on the i+3$^{th}$ row are reset.

Next, by setting the drive signal pSEL_i+3 to the Low level at time t29, the pixels 102 on the i+3$^{th}$ row are disconnected from the signal lines 103, and the pixel selection is completed. Then, at this timing, the horizontal scanning circuit 108 transfers the noise signals N_i+3 again and the image signal A+B_i+3 of the i+3$^{th}$ row from the first memories 107a to the signal processing circuit 109. The signal processing circuit 109 obtains an image signal with reduced noise by taking the differences between the digital image signals A+B_i+3 and the noise signals N_i+3. Further, a second focus detection signal B_i+3 is obtained by taking the differences between the image signal A+B_i+3 and the first focus detection signal A_i+3 at the signal processing circuit 109.

The signals are read out from the pixels of the i+5$^{th}$ row to the i+7$^{th}$ row in the same manner as explained with reference to FIG. 5, and the signals are read out from the pixels in the i+4$^{th}$ row in the same manner as explained with reference to FIG. 6.

As described above, according to the first embodiment, in the image sensor that can read out signals from the focus detection areas and the non-focus detection areas separately, the interval between reading the noise signals and the image signals can be set to be equivalent between the focus detection areas and non-focus detection areas.

Second Embodiment

Next, a second embodiment of the disclosure will be described.

An image sensor in the second embodiment is different from the image sensor in the first embodiment in that the column circuit 104 shown in FIG. 1 has an amplifier circuit. Since the other configurations are the same as those of the first embodiment, the description thereof will be omitted.

Figure 3:
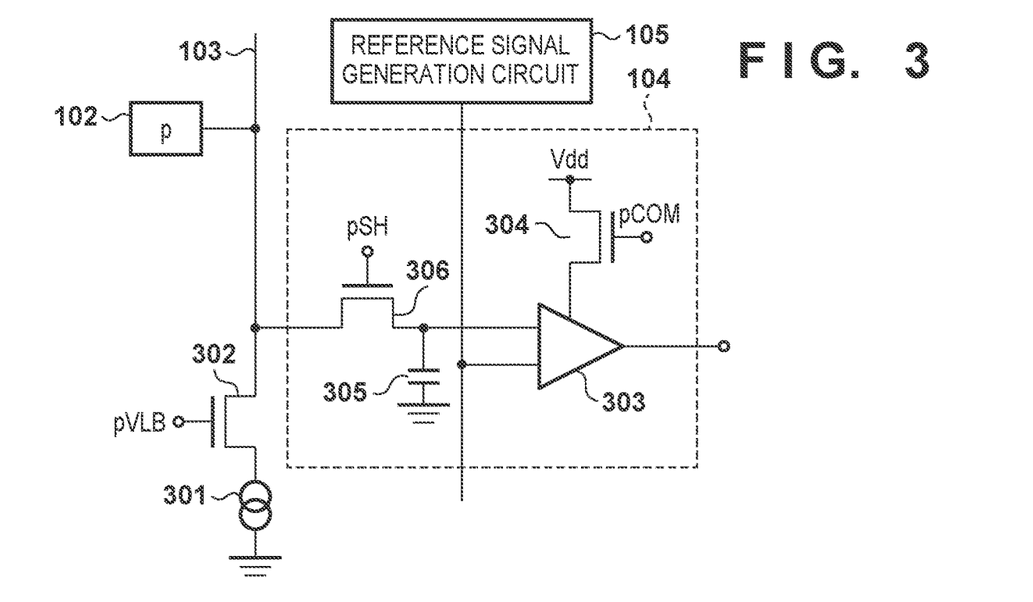
FIG. 3 is a circuit diagram showing a schematic configuration of a column circuit and its peripheral circuits according to the first embodiment.
Figure 7:
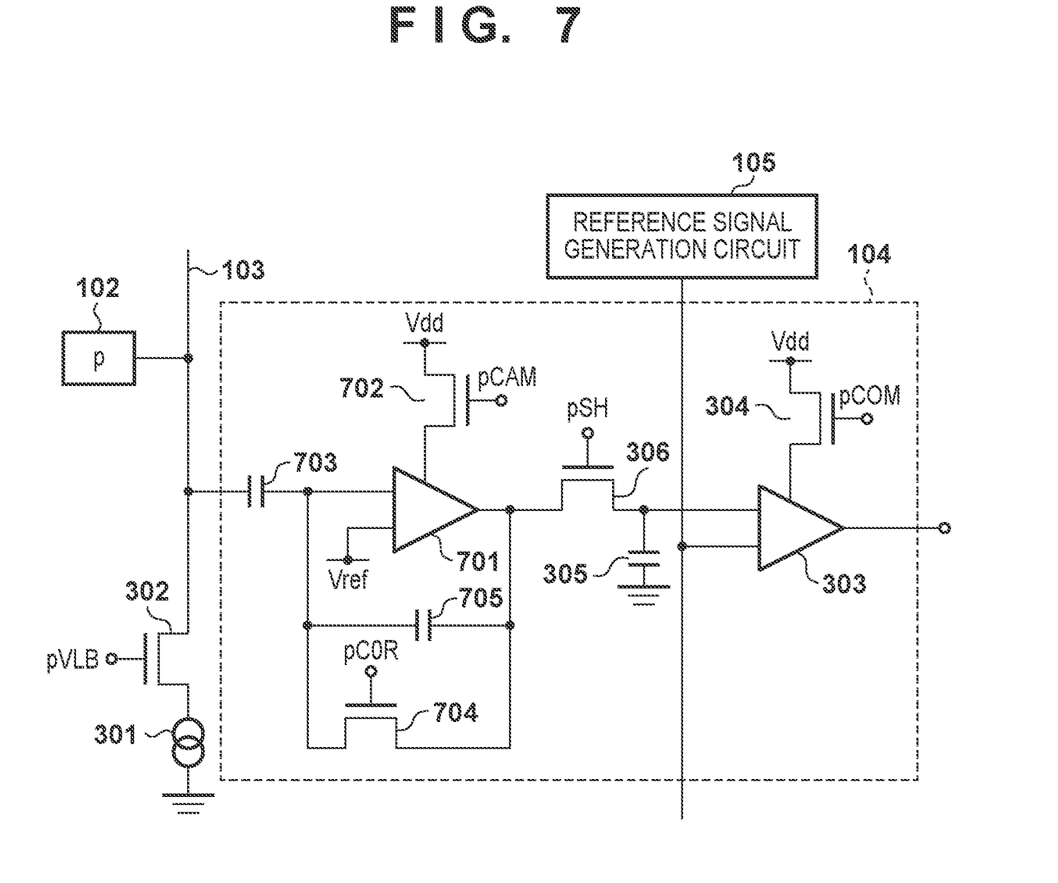
FIG. 7 is a circuit diagram showing a schematic configuration of a column circuit included in the image sensor according to the second embodiment.

FIG. 7 is a circuit diagram showing an example of the configuration of the column circuit 104 in the second embodiment, and is used instead of the column circuit 104 shown in FIG. 3. The same reference numerals are assigned to the same configurations as those shown in FIG. 3, and the description thereof will be omitted as appropriate. As shown in FIG. 7, the column circuit 104 in the second embodiment includes an amplifier circuit. The amplifier circuit has a differential amplifier 701 which is provided between the signal line 103 and the switch 306.

The differential amplifier 701 is connected to the signal line 103 and amplifies the signal output from the pixel 102. A switch 702 switches between an operating state and a non-operating state of the differential amplifier 701. By setting a drive signal pCAM supplied to the gate of the switch 702 to the High level, the differential amplifier 701 can be put into the operating state. The gain of the differential amplifier 701 is determined by the capacitance of an amplification capacitor 705.

A switch 704 controls a clamping operation of the reference voltage Vref of the differential amplifier 701. When the switch 704 is turned on by setting a drive signal pCOR supplied to the gate of the switch 704 to the High level, a clamp capacitor 703 can clamp the reference voltage Vref of the differential amplifier 701 to the signal of the signal line 103.

Next, an example of an output operation of the pixel unit 100 in the second embodiment will be described with reference to FIGS. 8 and 9. In particular, the differences from the output operation described with reference to FIGS. 5 and 6 in the first embodiment will be described, and the description of the same output operation will be omitted as appropriate.

Figure 8:
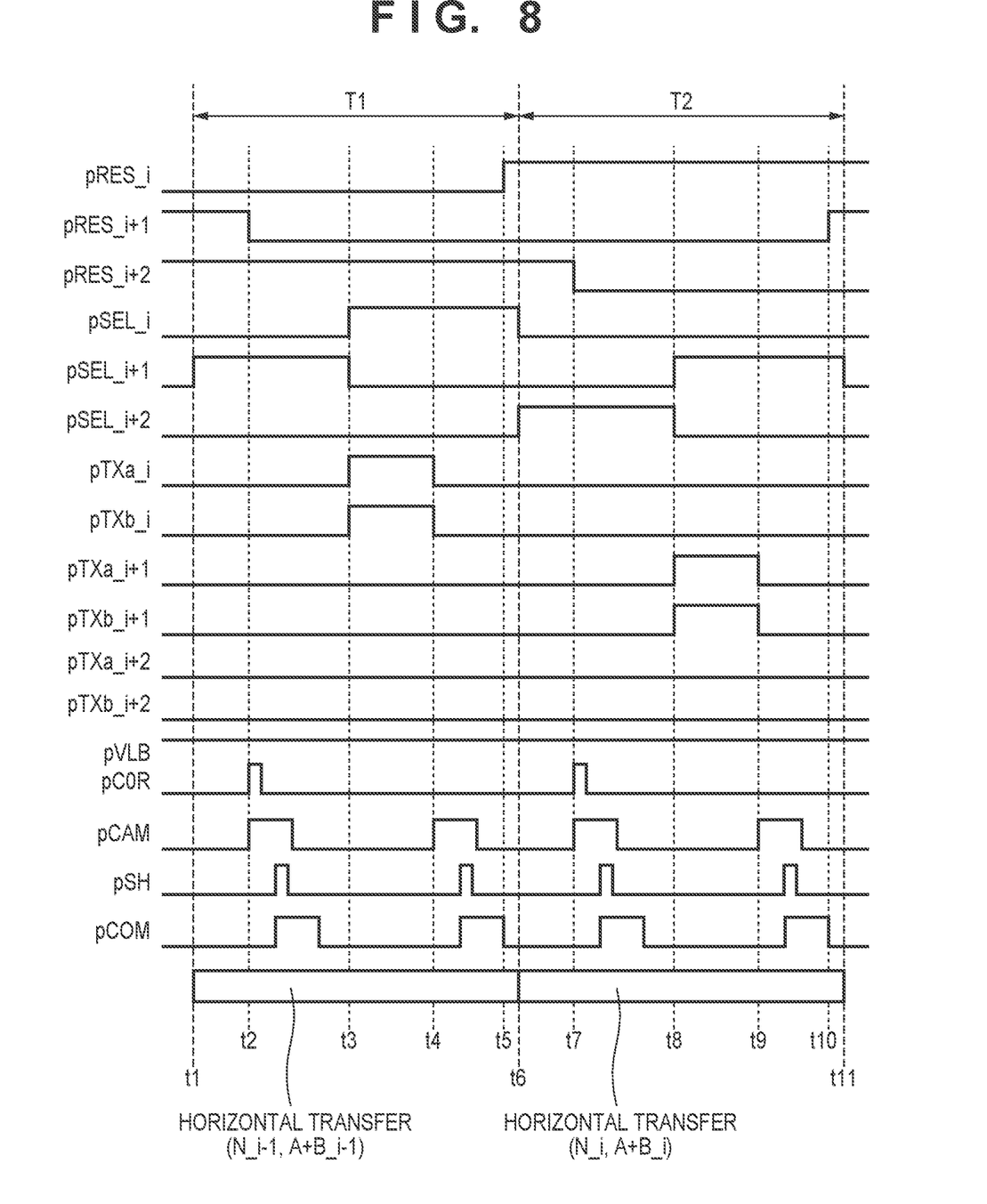
FIG. 8 is a timing chart showing a readout operation of a non-focus detection pixel according to the second embodiment.
Figure 9:
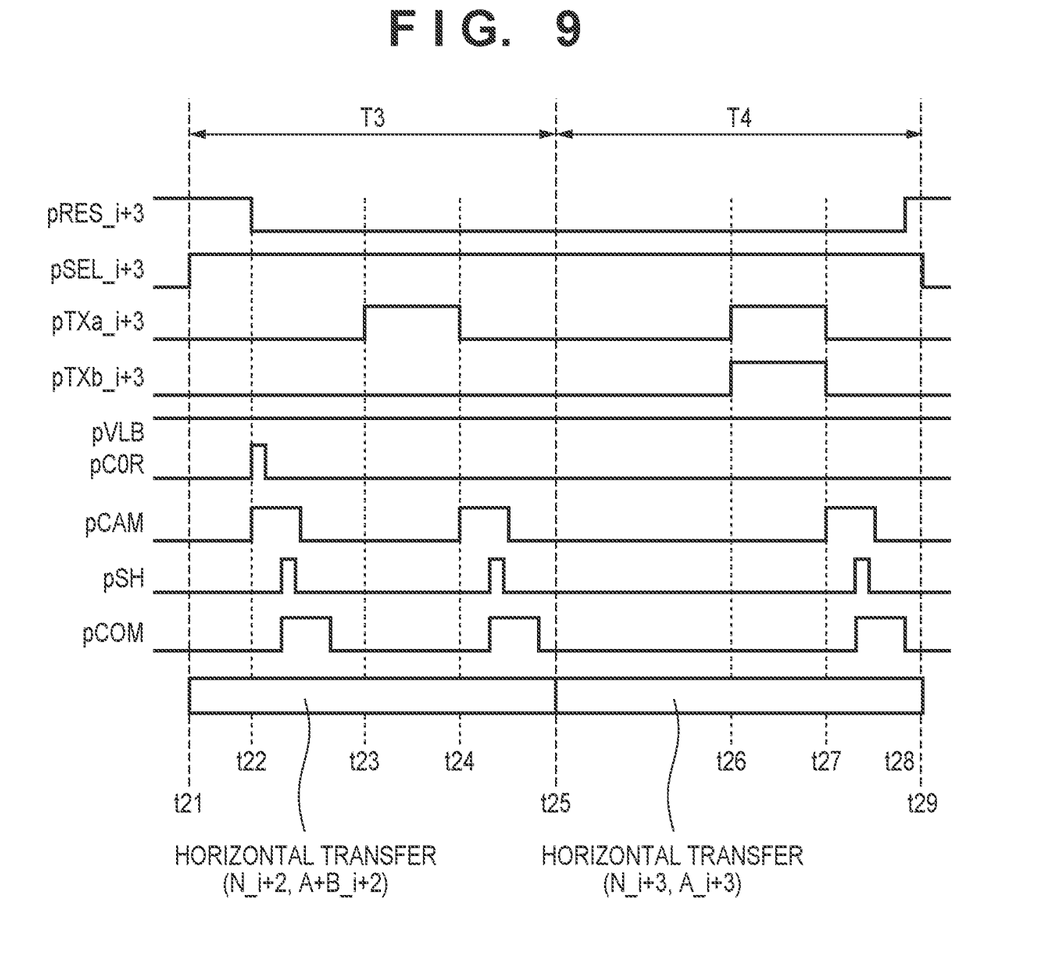
FIG. 9 is a timing chart showing a readout operation of a focus detection pixel according to the second embodiment.

FIG. 8 is a timing chart showing the timing of drive signals for the readout periods T1 and T2 for the pixels in the non-focus detection areas shown in FIG. 4. As in FIGS. 5 and 6, the row number is appended after each drive signal shown in FIGS. 2 and 7 to specify the drive signal for each row, and the row number is appended after the pixel signals to specify the pixel signals of each row. The difference from the first embodiment is that the signal from the pixel 102 is amplified by the amplifier circuit before being held in the S/H capacitor 305 via the signal line 103.

By setting the drive signal pRES_i+1 to the Low level at time t2, the reset transistors 205 of the pixels 102 on the i+1$^{th}$ row are turned off, thereby the resetting of the FDs 203 is completed. Then, by setting the drive signals pCOR and pCAM to the High level, the reference voltages Vref of the differential amplifiers 701 are clamped, and the differences between the clamped reference voltages Vref and the voltages of the clamp capacitors 703 are amplified by the differential amplifiers 701 and output. Here, since the clamp capacitors 703 are clamped to the reference voltages Vref, 0V is ideally output. These signals are A/D converted to become digital noise signals N_i+1 (corresponding to N on the i+1 row in FIG. 4).

Then, between time t3 and time t4, the drive signal pTXa_i and the drive signal pTXb_i are set to the High level, and the charges accumulated in the photoelectric converters 201a and 201b of the pixels 102 on the i$^{th}$ row are transferred to the FDs 203. Then, by setting the drive signal pCAM to the High level at time t4, the differences between the image signals A+B_i and the reference voltages Vref are amplified and output. These signals are A/D converted to become digital image signals A+B_i (corresponding to AB on the i$^{th}$ row in FIG. 4).

After that, the operation up to time t7 is the same as that of the first embodiment.

At time t7, the reset transistors 205 of the pixels 102 on the i+2$^{th}$ row are turned off by setting the drive signal pRES_i+2 to the Low level, and the resetting of the FDs 203 is completed. Then, by setting the drive signals pCOR and pCAM to the High level, the reference voltages Vref of the differential amplifiers 701 are clamped, and the differences between the clamped reference voltages Vref and the voltages of the clamp capacitors 703 are amplified by the differential amplifiers 701 and output. These signals are A/D converted to become digital noise signals N_i+2 (corresponding to N on the i+2$^{th}$ row in FIG. 4).

Then, between time t8 and time t9, the drive signal pTXa_i+1 and the drive signal pTXb_i+1 are set to the High level, and the charges accumulated in the photoelectric converters 201a and 201b of the pixels 102 on the i+1th row are transferred to the FDs 203, and then by setting the drive signal pCAM to the High level at time t9, the differences between the image signals A+B_i+1 and the reference voltages Vref are amplified and output. These signals are A/D converted to become digital image signals A+B_i+1 (corresponding to AB on the i+1$^{th}$ row in FIG. 4).

The operation after this is the same as that shown in FIG. 5 in the first embodiment.

At this time, when reading the A+B signals, the noise signals N on a different row are clamped as the reference voltages Vref, so an error may be included in the A+B signals. In that case, in the signal processing circuit 109, the differences between the noise signals N in the row where the A+B signals is read out and the noise signals N in the row where the reference voltages Vref are clamped when reading the A+B signals may be taken and used as the correction values for the A+B signals.

Next, with reference to FIG. 9, the readout of the pixels on the i+3 row in the focus detection area during the readout periods T3 and T4 for the pixels in the focus detection areas of FIG. 4 will be described.

At time t21, by setting the drive signal pSEL_i+3 to the High level, the selection transistors 206 of the pixels 102 on the i+3$^{th}$ row are turned ON. As a result, the pixels 102 on the i+3$^{th}$ row are connected to the signal lines 103. After that, by setting the drive signal pRES_i+3 to the Low level at time t22, the reset transistors 205 of the pixels 102 on the i+3$^{th}$ row are turned off, and the resetting of the FDs 203 is completed. Then, by setting the drive signals pCOR and pCAM to the High level, the reference voltages Vref of the differential amplifiers 701 are clamped, and the differences between the clamped reference voltages Vref and the voltages of the clamp capacitors 703 are amplified by the differential amplifiers 701 and output. These signals are A/D converted to become digital noise signals N_i+3 (corresponding to N on the i+3rd row in FIG. 4).

Next, by setting the drive signal pTXa_i+3 to the High level between time t23 and time t24, the charges accumulated in the photoelectric converters 201a of the pixels 102 on the i+3rd row are transferred to the FDs 203. Then, by setting the drive signal pCAM to the High level at time t24, the differences between the focus detection signals A_i+3 and the reference voltages Vref are amplified and output. These signals are A/D converted to become digital focus detection signals A_i+3 (corresponding to A in the row of FIG. 4).

After that, the operation up to time t27 is the same as that of the first embodiment.

By setting the drive signal pCAM to the High level at time t27, the differences between the image signals A+B_i+3 and the reference voltages Vref are amplified and output. These signals are A/D converted to become digital image signals A+B_i+3 (corresponding to AB on the i$^{th}$ row in FIG. 4).

Subsequent operation is the same as that of the first embodiment.

By controlling the reading as described above, even if the column circuit 104 has an amplifier circuit, in the non-focus detection areas and the focus detection areas, the interval from the readout of the noise signal to the readout of the image signal for each row can be made equal.

In the present embodiment, when the noise signals N of each pixel row are read, the reference voltages Vref of the differential amplifiers 701 are clamped, but the clamping operation may be performed at every frame or at the timing when the readout area is switched from the focus detection areas to the non-focus detection areas, for example.

As described above, according to the second embodiment, even if the column circuit has an amplifier circuit, the same effect as that of the first embodiment can be obtained.

Third Embodiment

Next, a third embodiment of the disclosure will be described.

Figure 10:
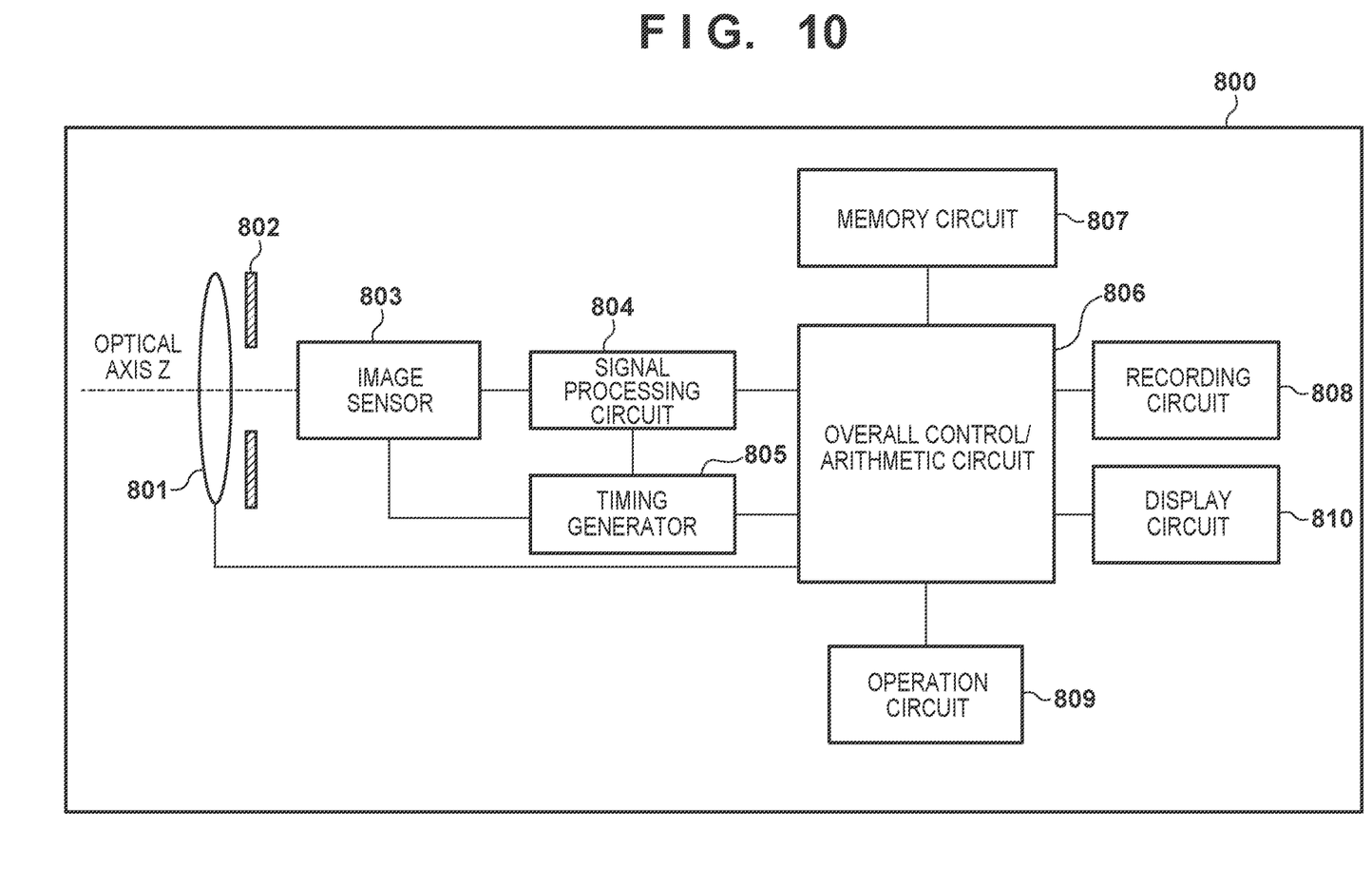
FIG. 10 is a block diagram showing an overall configuration of an image capturing apparatus according to a third embodiment.

FIG. 10 is a block diagram showing a schematic configuration of an image capturing apparatus 800 (digital camera, dashboard camera, smartphone, etc.) according to the third embodiment.

In FIG. 10, an imaging optical system of an image capturing apparatus 800 includes an imaging lens 801 and a diaphragm 802. The light that has passed through the imaging lens 801 and the diaphragm 802 is formed on an imaging surface of an image sensor 803 arranged near the focal position of the imaging lens 801. Although the imaging lens 801 is shown as a single lens, it is actually composed of a lens group including a plurality of lenses. The image sensor 803 has a function of capturing a subject image formed by the imaging lens 801 as a signal. In the present embodiment, the image sensor 803 has the configuration of the image sensor described in the first or second embodiment.

A signal processing circuit 804 in the image capturing apparatus 800 performs various corrections such as signal amplification and reference level adjustment, rearrangement of data, and the like on the signal output from the image sensor 803. Further, a process of generating a second focus detection signal B is also performed by subtracting the first focus detection signal A from the image signal A+B output from each pixel in the focus detection areas.

A timing generator 805 outputs the drive timing signals to the image sensor 803 and the signal processing circuit 804.

An overall control/arithmetic circuit 806 performs overall drive and control of the entire image capturing apparatus 800 including the image sensor 803 and the signal processing circuit 804. In addition, the overall control/arithmetic circuit 806 performs predetermined image processing, defect correction, and the like on the image signal output from the signal processing circuit 804. Further, the overall control/arithmetic circuit 806 performs focus detection based on the phase difference between an A image generated by collecting the first focus detection signals A and a B image generated by collecting the second focus detection signals B output from the signal processing circuit 804. Focus adjustment can be performed by driving a focus lens included in the imaging lens 801 based on the focus state obtained by this focus detection.

A memory circuit 807 and a recording circuit 808 are recording media such as a non-volatile memory or a memory card that records and holds an image signal or the like output from the overall control/arithmetic circuit 806.

An operation circuit 809 receives signals from operation members provided on the image capturing apparatus 800 and transmits the user's command to the overall control/arithmetic circuit 806. A display circuit 810 displays an image after shooting, a live view image, various setting screens, and the like.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-69278, filed on Apr. 7, 2020 which is hereby incorporated by reference herein in its entirety.

What is claimed is:

1. A sensor comprising:
   a pixel portion, where a plurality of pixels are arranged in a matrix, having a first area from which image signals are output and a second area from which image signals and focus detection signals are output; and
   a controller that controls readout of signals from the pixel portion in units of rows,
   wherein the controller
      controls to read out a noise signal that is a signal corresponding to a reset level for resetting each pixel and an image signal, from each pixel in the first area,
      controls to read out a noise signal that is a signal corresponding to a reset level for resetting each pixel, a focus detection signal, and an image signal, from each pixel in the second area, and
      controls so that a time from when the noise signal is read out to when the image signal is read out from each pixel becomes equal between the first area and the second area, and in the first area, during a period after the noise signal is read out before the image signal is read out from each pixel, at least one of the noise signal and the image signal from another row in the first area is read out.

2. The sensor according to claim 1, wherein each pixel included in the second area includes a microlens and a plurality of photoelectric conversion portions, and outputs a signal from a part of the plurality of photoelectric conversion portions as the focus detection signal, and adds signals from all the plurality of photoelectric conversion portions and outputs a sum as the image signal.

3. The sensor according to claim 1, wherein the controller controls to readout from respective pixels in the first area noise signals of an $i+1^{th}$ row (i is a natural number), at least either of image signals of an $i^{th}$ row and noise signals of an $i+2^{th}$ row, and image signals of the $i+1^{th}$ row in this order.

4. The sensor according to claim 1, further comprising an analog-to-digital converter that performs analog-to-digital conversion on signals output from the pixel portion.

5. The sensor according to claim 1, further comprising:
   an amplifier that amplifies signals output from the pixel portion; and
   an analog-to-digital converter that performs analog-to-digital conversion on the amplified signals.

6. An apparatus comprising:
   a sensor having:
      a pixel portion, where a plurality of pixels are arranged in a matrix, having a first area from which image signals are output and a second area from which image signals and focus detection signals are output; and
      a controller that controls readout of signals from the pixel portion in units of rows,
      wherein the controller
         controls to read out a noise signal that is a signal corresponding to a reset level for resetting each pixel and an image signal, from each pixel in the first area,
         controls to read out a noise signal that is a signal corresponding to a reset level for resetting each pixel, a focus detection signal, and an image signal, from each pixel in the second area, and
         controls so that a time from when the noise signal is read out to when the image signal is read out from each pixel becomes equal between the first area and the second area, and in the first area, during a period after the noise signal is read out before the image signal is read out from each pixel, at least one of the noise signal and the image signal from another row in the first area is read out;
   a generation unit that generates a second focus detection signal for each pixel in the second area by taking a difference between the image signal and the focus detection signal; and
   a focus detection unit that performs focus detection based on a phase difference between the focus detection signals and the second focus detection signals,
   wherein each unit is implemented by one or more processors.

7. The apparatus according to claim 6, wherein each pixel included in the second area includes a microlens and a plurality of photoelectric conversion portions, and outputs a signal from a part of the plurality of photoelectric conversion portions as the focus detection signal, and adds signals from all the plurality of photoelectric conversion portions and outputs a sum as the image signal.

8. The apparatus according to claim 6, wherein the controller controls to readout from respective pixels in the first area noise signals of an $i+1^{th}$ row (i is a natural number), at least either of image signals of an $i^{th}$ row and noise signals of an $i+2^{th}$ row, and image signals of the $i+1^{th}$ row in this order.

9. The apparatus according to claim 6, wherein the sensor further has an analog-to-digital converter that performs analog-to-digital conversion on signals output from the pixel portion.

10. The apparatus according to claim 6, where the sensor further has:
   an amplifier that amplifies signals output from the pixel portion; and
   an analog-to-digital converter that performs analog-to-digital conversion on the amplified signals.

11. A method of controlling readout of signals in units of rows from a sensor having a pixel portion, where a plurality of pixels are arranged in a matrix, having a first area from which image signals are output and a second area from which image signals and focus detection signals are output, the method comprising:

reading out a noise signal that is a signal corresponding to a reset level for resetting each pixel and an image signal, from each pixel in the first area, reading out a noise signal that is a signal corresponding to a reset level for resetting each pixel, a focus detection signal, and an image signal, from each pixel in the second area, and controlling so that a time from when the noise signal is read out to when the image signal is read out from each pixel becomes equal between the first area and the second area, and in the first area, during a period after the noise signal is read out before the image signal is read out from each pixel, reading out at least one of the noise signal and the image signal from another row in the first area.

12. The method according to claim 11, wherein each pixel included in the second area includes a microlens and a plurality of photoelectric conversion portions, and outputs a signal from a part of the plurality of photoelectric conversion portions as the focus detection signal, and adds signals from all the plurality of photoelectric conversion portions and outputs a sum as the image signal.

13. The method according to claim 11, further comprising performing control to readout from respective pixels in the first area noise signals of an i+1$^{th}$ row (i is a natural number), at least either of image signals of an i$^{th}$ row and noise signals of an i+2$^{th}$ row, and image signals of the i+1$^{th}$ row in this order.

14. The method according to claim 11, further comprising performing analog-to-digital conversion on signals output from the pixel portion.

15. The method according to claim 11, further comprising:

amplifying signals output from the pixel portion; and performing analog-to-digital conversion on the amplified signals.

16. A non-transitory computer-readable storage medium, the storage medium storing a program that is executable by a computer, wherein the program includes program codes for causing the computer to execute a method of controlling readout of signals in units of rows from an image sensor having a pixel portion, where a plurality of pixels are arranged in a matrix, having a first area from which image signals are output and a second area from which image signals and focus detection signals are output, the method comprising:

reading out a noise signal that is a signal corresponding to a reset level for resetting each pixel and an image signal, from each pixel in the first area, reading out a noise signal that is a signal corresponding to a reset level for resetting each pixel, a focus detection signal, and an image signal, from each pixel in the second area, and controlling so that a time from when the noise signal is read out to the when image signal is read out from each pixel becomes equal between the first area and the second area, and in the first area, during a period after the noise signal is read out before the image signal is read out from each pixel, reading out at least one of the noise signal and the image signal from another row in the first area.

17. The non-transitory computer-readable storage medium according to claim 16, wherein each pixel included in the second area includes a microlens and a plurality of photoelectric conversion portions, and outputs a signal from a part of the plurality of photoelectric conversion portions as the focus detection signal, and adds signals from all the plurality of photoelectric conversion portions and outputs a sum as the image signal.

18. The non-transitory computer-readable storage medium according to claim 16, further comprising performing control to readout from respective pixels in the first area noise signals of an i+1$^{th}$ row (i is a natural number), at least either of image signals of an i$^{th}$ row and noise signals of an i+2$^{th}$ row, and image signals of the i+1$^{th}$ row in this order.

19. The non-transitory computer-readable storage medium according to claim 16, further comprising performing analog-to-digital conversion on signals output from the pixel portion.

20. The non-transitory computer-readable storage medium according to claim 16, further comprising:

amplifying signals output from the pixel portion; and performing analog-to-digital conversion on the amplified signals.

\* \* \* \* \*